(12) United States Patent
Van Wees et al.

(10) Patent No.: US 9,079,118 B2
(45) Date of Patent: Jul. 14, 2015

(54) PROCESS AND APPARATUS FOR RECOVERING HYDROPROCESSED HYDROCARBONS WITH STRIPPER COLUMNS

(71) Applicant: UOP LLC, Des Plaines, IL (US)

(72) Inventors: Mark Van Wees, Des Plaines, IL (US); David M. Bowman, Cary, IL (US); Xin X. Zhu, Long Grove, IL (US)

(73) Assignee: UOP LLC, Des Plaines, IL (US)

( * ) Notice: Subject to any disclaimer, the term of this patent is extended or adjusted under 35 U.S.C. 154(b) by 32 days.

(21) Appl. No.: 13/836,967

(22) Filed: Mar. 15, 2013

(65) Prior Publication Data

US 2014/0271396 A1 Sep. 18, 2014

(51) Int. Cl.
*B01J 8/00* (2006.01)
*B01D 3/00* (2006.01)

(52) U.S. Cl.
CPC .. *B01D 3/009* (2013.01); *B01J 8/00* (2013.01)

(58) Field of Classification Search
CPC .......................................................... B01J 8/00
USPC .......................................... 422/187; 585/250
See application file for complete search history.

(56) References Cited

U.S. PATENT DOCUMENTS

| | | | | |
|---|---|---|---|---|
| 2,433,020 A * | 12/1947 | Becker | ........................... | 585/474 |
| 3,445,378 A * | 5/1969 | De Graff | ........................ | 208/104 |
| 3,574,090 A * | 4/1971 | Hallman | ........................ | 208/108 |
| 4,808,298 A * | 2/1989 | Peck et al. | ..................... | 208/212 |
| 4,925,573 A | 5/1990 | Vorlow | | |
| 4,994,170 A | 2/1991 | Lipinski et al. | | |
| 5,164,070 A | 11/1992 | Munro | | |
| 5,258,117 A | 11/1993 | Kolstad et al. | | |
| 5,453,177 A * | 9/1995 | Goebel et al. | ................. | 208/102 |
| 5,707,052 A * | 1/1998 | Adams et al. | ................... | 269/22 |
| 5,720,872 A * | 2/1998 | Gupta | ............................. | 208/57 |
| 5,980,732 A * | 11/1999 | Gillis | .............................. | 208/210 |
| 6,096,191 A * | 8/2000 | Kalnes | ........................... | 208/105 |
| 6,379,532 B1 | 4/2002 | Hoehn et al. | | |
| 6,444,116 B1 | 9/2002 | Galiasso et al. | | |
| 6,517,706 B1 * | 2/2003 | Pruden et al. | ................. | 208/108 |
| 6,660,157 B2 | 12/2003 | Que et al. | | |
| 6,787,026 B2 * | 9/2004 | Farshid | ........................... | 208/89 |
| 6,797,154 B2 * | 9/2004 | Mukherjee et al. | ............. | 208/58 |
| 7,074,321 B1 | 7/2006 | Kalnes | | |
| 7,238,277 B2 * | 7/2007 | Dahlberg et al. | ................ | 208/58 |
| 7,250,107 B2 * | 7/2007 | Benazzi et al. | .................. | 208/89 |
| 7,575,670 B1 * | 8/2009 | VanWees | ....................... | 208/212 |
| 7,591,940 B2 | 9/2009 | Kalnes | | |
| 7,686,941 B2 | 3/2010 | Brierley et al. | | |
| 2002/0189972 A1* | 12/2002 | Benazzi et al. | .................. | 208/57 |
| 2010/0329935 A1 | 12/2010 | McGehee et al. | | |

(Continued)

OTHER PUBLICATIONS

U.S. Appl. No. 13/836,559, filed Mar. 15, 2013.

(Continued)

*Primary Examiner* — Walter D Griffin
*Assistant Examiner* — Huy-Tram Nguyen
(74) *Attorney, Agent, or Firm* — James C. Paschall

(57) ABSTRACT

Two or three strippers are used to strip three hydroprocessed effluent streams, perhaps from a slurry hydrocracking reactor, separated by temperature instead of a single stripper to preserve separations previously made and conserving energy and reducing vessel size. A cold stripped stream may be taken as a diesel blending stock without further fractionation.

20 Claims, 5 Drawing Sheets

(56) References Cited

U.S. PATENT DOCUMENTS

| | | |
|---|---|---|
| 2012/0292229 A1 | 11/2012 | Wieber et al. |
| 2013/0043162 A1 | 2/2013 | Hoehn et al. |
| 2013/0045138 A1 | 2/2013 | Hoehn et al. |
| 2013/0045140 A1 | 2/2013 | Hoehn et al. |
| 2013/0045141 A1 | 2/2013 | Hoehn et al. |

OTHER PUBLICATIONS

U.S. Appl. No. 13/836,714, filed Mar. 15, 2013.
U.S. Appl. No. 13/836,883, filed Mar. 15, 2013.

* cited by examiner

9,079,118 B2

PROCESS AND APPARATUS FOR RECOVERING HYDROPROCESSED HYDROCARBONS WITH STRIPPER COLUMNS

FIELD OF THE INVENTION

The field of the invention is the recovery of hydroprocessed hydrocarbon streams.

BACKGROUND OF THE INVENTION

Hydroprocessing includes processes which convert hydrocarbons in the presence of hydroprocessing catalyst and hydrogen to more valuable products.

Hydrotreating is a hydroprocessing process used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst.

Slurry hydrocracking is a slurried catalytic process used to crack residue feeds to gas oils and fuels. Slurry hydrocracking is used for the primary upgrading of heavy hydrocarbon feedstocks obtained from the distillation of crude oil, including hydrocarbon residues or gas oils from atmospheric column or vacuum column distillation. In slurry hydrocracking, these liquid feedstocks are mixed with hydrogen and solid catalyst particles, e.g., as a particulate metallic compound such as a metal sulfide, to provide a slurry phase. Slurry hydrocracked effluent exits the slurry hydrocracking reactor at very high temperatures around 400 to 500° C. (752 to 932° F.). Representative slurry hydrocracking processes are described, for example, in U.S. Pat. No. 5,755,955 and U.S. Pat. No. 5,474,977.

Hydroprocessing recovery units typically include a stripper for stripping hydroprocessed effluent with a stripping medium such as steam to remove unwanted hydrogen sulfide. The stripped effluent then is heated in a fired heater to fractionation temperature before entering a product fractionation column to separate and recover products such as naphtha, kerosene and diesel.

Hydroprocessing and particularly hydrocracking is very energy-intensive due to the severe process conditions such as the high temperature and pressure used. Over time, although much effort has been spent on improving energy performance for hydrocracking, the focus has been on reducing reactor heater duty. However, a large heater duty is still required to heat stripped effluent before entering the product fractionation column.

There is a continuing need, therefore, for improved methods of recovering fuel products from hydroprocessed effluents. Such methods must be more energy efficient to meet the increasing needs of refiners.

BRIEF SUMMARY OF THE INVENTION

Utilization of two or three strippers is proposed instead of a single stripper for a hydroprocessing unit to reduce heater duty for a product fractionation column by at least approximately 40%. At the same time, capital costs are counter intuitively reduced.

In a process embodiment, the invention comprises a slurry hydrocracking process comprising slurry hydrocracking a hydrocarbon feed in a slurry hydrocracking reactor to provide hydroprocessing effluent stream; stripping a relatively cold hydroprocessing effluent stream which is a portion of the hydroprocessing effluent stream in a cold stripper column to provide a cold stripped stream; stripping a relatively warm hydroprocessing effluent stream which is a portion of the hydroprocessing effluent stream; and stripping a relatively hot hydroprocessing effluent stream which is a portion of the hydroprocessing effluent stream in a hot stripper column to provide a hot stripped stream.

In an additional process embodiment, the invention comprises a hydroprocessing process comprising hydroprocessing a hydrocarbon feed in a hydroprocessing reactor to provide a hydroprocessed effluent stream; stripping a relatively cold hydroprocessing effluent stream which is a portion of the hydroprocessing effluent stream in a cold stripper column to provide a cold stripped stream; stripping a relatively warm hydroprocessing effluent stream which is a portion of the hydroprocessing effluent stream in a warm stripper column to provide a warm stripped stream; and stripping a relatively hot hydroprocessing effluent stream in a hot stripper column which is a portion of the hydroprocessing effluent stream to provide a hot stripped stream.

In a further process embodiment, the invention comprises a slurry hydrocracking process comprising slurry hydrocracking a hydrocarbon feed in a slurry hydrocracking reactor to provide hydroprocessing effluent stream; stripping a relatively cold hydroprocessing effluent stream which is a portion of the hydroprocessing effluent stream in a cold stripper column to provide a cold stripped stream; stripping a relatively warm hydroprocessing effluent stream which is a portion of the hydroprocessing effluent stream in a warm stripper column to provide a warm stripped stream; and stripping a relatively hot hydroprocessing effluent stream which is a portion of the hydroprocessing effluent stream in a hot stripper column to provide a hot stripped stream.

In an apparatus embodiment, the invention comprises an apparatus for slurry hydrocracking comprising a slurry hydrocracking reactor; a cold stripper column in communication with the slurry hydrocracking reactor; a hot stripper column in communication with the slurry hydrocracking reactor; and a warm separator in communication with the slurry hydrocracking reactor.

In an additional apparatus embodiment, the invention comprises an apparatus for hydroprocessing comprising a hydroprocessing reactor; a cold stripper column in communication with the hydroprocessing reactor; a warm stripper column in communication with the hydroprocessing reactor; and a hot stripper column in communication with the hydroprocessing reactor.

In a further apparatus embodiment, the invention comprises an apparatus for slurry hydrocracking comprising a slurry hydrocracking reactor; a cold stripper column in communication with the slurry hydrocracking reactor; a warm stripper column in communication with the slurry hydrocracking reactor; and a hot stripper column in communication with the slurry hydrocracking reactor.

DEFINITIONS

Figure 1:
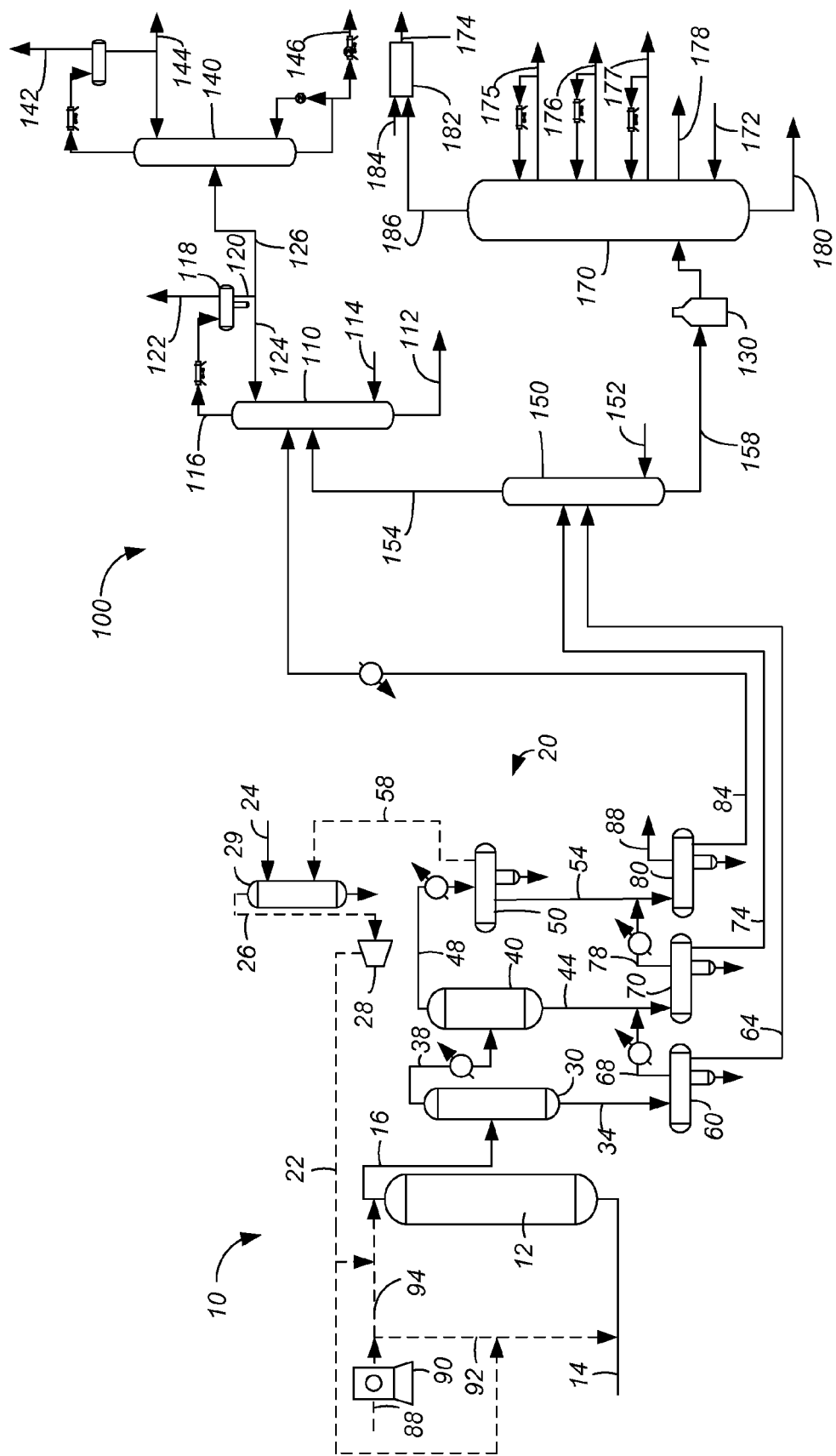
FIG. 1 is a simplified process flow diagram of an embodiment of the present invention.

As used herein, "bypass" with respect to a vessel or zone means that a stream does not pass through the zone or vessel bypassed although it may pass through a vessel or zone that is not designated as bypassed.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "diesel boiling range" means hydrocarbons boiling in the range of between about 132° and about 399° C. (270° to 750° F.) using the True Boiling Point distillation method.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" can mean an amount of at least generally about 50%, optimally about 60%, and preferably about 70%, by weight, of a compound or class of compounds in a stream.

DETAILED DESCRIPTION

The subject invention can be applicable to any hydroprocessing apparatus or process that has a reactor effluent of very high temperature. Slurry hydrocracking is one such hydroprocessing process, so the description will be directed to slurry hydrocracking although the application is not so limited.

Slurry hydrocracking is very energy intensive due to the conversion of bottom of barrel crude material to transportation fuels under high temperature and pressure. Slurry hydrocracking processes and apparatuses may utilize one stripper which receives three feeds, one from a cold separator via a cold flash drum, one from a warm separator via a warm flash drum, and another from a hot separator via a hot flash drum. Although these three feeds contain very different compositions separated by boiling point temperature, they can be traced back to the same location, which is the hot separator and the hydroprocessing reactor.

Eventually, the liquid from the hot, warm, and cold flash drums are fed to a single stripper column. The stripper bottom stream becomes the feed for the product fractionation column. The inefficiency of this one-stripper design is rooted in mixing of the hot flash drum, warm flash drum, and cold flash drum liquids, which wastes the separation previously accomplished in the hot separator and the warm separator and thus has a negative impact on the energy efficiency in the heater for the product fractionation column.

Utilization of two or three strippers is proposed to reduce the heater duty for the product fractionation column by at least approximately 40% and counter intuitively reduce capital costs.

The apparatus and process involves a hydroprocessing section 10, a separator section 20 and a fractionation section 100. The hydroprocessing section 10 can include a hydroprocessing reactor 12 that may be a slurry hydrocracking reactor 12, a recycle gas scrubber 29, and a recycle gas compressor 28.

Generally, the hydroprocessing reactor 12 can operate at any suitable conditions, such as a temperature of about 400 to about 500° C. (752 to 932° F.) and a pressure of about 3 to about 24 MPa. Exemplary slurry hydrocracking reactors are disclosed in, e.g., U.S. Pat. No. 5,755,955; U.S. Pat. No. 5,474,977; US 2009/0127161; US 2010/0248946; US 2011/0306490; and US 2011/0303580. Often, slurry hydrocracking is carried out using reactor conditions sufficient to crack at least a portion of a hydrocarbon feed 14 to lower boiling products, such as one or more distillate hydrocarbons, naphtha, and/or C1-C4 products. The hydrocarbon feed 14 can include hydrocarbons boiling from about 340 to about 570° C. (644 to 1058° F.), and may include one or more of a crude oil atmospheric distillation column residuum boiling above about 340° C. (644° F.), a crude oil vacuum distillation column residuum boiling above about 560° C. (1044° F.), tars, a bitumen, coal oils, and shale oils. A catalyst may be combined with the feed 14 to obtain a solids content of about 0.01 to about 10%, by weight, before being combined with hydrogen, as hereinafter described.

Typically, the slurry catalyst composition can include a catalytically effective amount of one or more compounds having iron. Particularly, the one or more compounds can include at least one of an iron oxide, an iron sulfate, and an iron carbonate. Other forms of iron can include at least one of an iron sulfide, a pyrrhotite, and a pyrite. What is more, the catalyst can contain materials other than an iron, such as at least one of molybdenum, nickel, and manganese, and/or a salt, an oxide, and/or a mineral thereof. Preferably, the one or more compounds include an iron sulfate, and more preferably, at least one of an iron sulfate monohydrate and an iron sulfate heptahydrate.

Alternatively, one or more catalyst particles can include about 2 to about 45%, by weight, iron oxide and about 20 to about 90%, by weight, alumina. In one exemplary embodiment, iron-containing bauxite is a preferred material having these proportions. Bauxite can have about 10 to about 40%, by weight, iron oxide, and about 54 to about 84%, by weight, alumina and may have about 10 to about 35%, by weight, iron oxide and about 55 to about 80%, by weight, alumina. Bauxite also may include silica and titania in amounts of usually no more than about 10%, by weight, and typically in amounts of no more than about 6%, by weight. Volatiles such as water and carbon dioxide may also be present, but the foregoing weight proportions exclude such volatiles. Typically, iron oxide is also present in bauxite in a hydrated form, but again the foregoing proportions exclude water in the hydrated composition.

In another exemplary embodiment, it may be desirable for the catalyst to be supported. Such a supported catalyst can be relatively resilient and maintain its particle size after being processed. As a consequence, such a catalyst can include a support of alumina, silica, titania, one or more aluminosilicates, magnesia, bauxite, coal and/or petroleum coke. Such a supported catalyst can include a catalytically active metal, such as at least one of iron, molybdenum, nickel, and vanadium, as well as sulfides of one or more of these metals. Generally, the catalyst can have about 0.01 to about 30%, by weight, of the catalytic active metal based on the total weight of the catalyst.

Make-up hydrogen may be provided in line 88 to compressor 90. The compressor 90 may have up to five stages of compression and discharge a hydrogen stream at a pressure of 2 to about 24 MPa. The make-up hydrogen from the compressor 90 can be provided to the hydroprocessing reactor 12. Particularly, the hydrogen may be provided as a stream 92 to the feed 14 to the hydroprocessing reactor 12 and as a stream 94 to quench the hydroprocessing effluent in line 16. A recycle hydrogen stream 22 may be split to supplement both streams 92 and 94.

The separator section 20 can include a hot separator 30, a warm separator 40, and a cold separator 50 which are all in downstream communication with the hydroprocessing reactor 12. Generally, a hydroprocessing effluent in line 16 from the hydroprocessing reactor 12 can be quenched with cool hydrogen from line 94 and provided to the hot separator 30 with various hydrocarbon streams being obtained, such as a separator hot hydroprocessing effluent stream in separator hot hydroprocessing line 34 from the hot separator 30, a separator warm hydroprocessing effluent stream in separator warm hydroprocessing line 44 from the warm separator 40, and a separator cold hydroprocessing effluent stream in a separator cold hydroprocessing line 54 from the cold separator 50. Often, the hot separator 30 can be operated at about 200 to about 500° C., and the warm separator 40 can be operated at about 170 to about 400° C. Generally, the cold separator 50 can be operated at no more than about 100° C., preferably no more than about 70° C. The separators 30, 40 and 50 all operate at a pressure of about the hydroprocessing reactor but a little less accounting for pressure drop through the lines. The separator hydroprocessing effluent streams in lines 34, 44, and 54, can be provided to the fractionation section 100. Moreover, a hot overhead stream in line 38 from the hot separator 30 can be cooled and provided to the warm separator 40, which in turn can provide a warm overhead stream in line 48 to the cold separator 50 after cooling. Consequently, the hot separator is in downstream communication with the hydroprocessing reactor 12. The warm separator is in downstream communication with the hydroprocessing reactor 12 and the hot separator 30 and the cold separator is in downstream communication with the hydroprocessing reactor 12, the hot separator 30 and the warm separator 40. The hot separator 30, the warm separator 40 and the cold separator 50 are used to reduce the temperature of the hydroprocessed effluent while separating gases from liquids.

The separator hot hydroprocessing effluent stream in separator hot hydroprocessing line 34 can be at a temperature between about 200 and about 500° C. and a pressure of about that the hot separator 30. The warm hydroprocessing effluent stream in separator warm hydroprocessing line 44 can be at a temperature between about 170 and about 400° C. and a pressure of about that of the warm separator 30. The cold hydroprocessing effluent stream in the separator cold hydroprocessing line 54 can be at a temperature of no more than about 100° C. and a pressure of about that the cold separator 30.

In addition, hydrogen gas can be recycled within the hydroprocessing section 10. Particularly, an overhead stream in cold separator overhead line 58 can be obtained from the cold separator 50. The hydrogen gas in the overhead stream can be cleaned by contact with a lean amine stream 24 and obtained as a top stream in line 26 from the recycle gas scrubber 29. The top stream in line 26 can be sent to the recycle gas compressor 28 to provide a recycle hydrogen stream 22 to the hydroprocessing reactor 12.

The separator section can also optionally include a hot flash drum 60, a warm flash drum 70 and a cold flash drum 80. The hot flash drum 60 can receive the separator hot hydroprocessing effluent stream in separator hot hydroprocessing line 34 from the hot separator 30, so is in downstream communication with the hot separator 30 and the hydroprocessing reactor 12. The hot flash drum 60 flashes the hot hydroprocessed effluent stream at lower pressure in separator hot hydroprocessing line 34 to separate a liquid flash hot hydroprocessing stream in flash hot hydroprocessing line 64 from a vaporous hot flash stream in hot flash overhead line 68. The hot hydroprocessing effluent stream in flash hot hydroprocessing line 64 is at a temperature between about 200 and about 500° C. and a pressure of between about 350 and about 6200 kPa which represent the conditions in the hot flash drum 60.

The warm flash drum 70 can receive a separator warm hydroprocessing effluent stream in the separator warm hydroprocessing line 44 from the warm separator 40. Moreover, the vaporous hot flash stream in the hot flash overhead line 68 from the hot flash drum 60 can be cooled and provided to the warm flash drum 70. Consequently, the warm flash drum is in downstream communication with the hot flash drum 60, the warm separator 40, the hot separator 30 and the hydroprocessing reactor 12. The warm flash drum 70 flashes the warm hydroprocessed effluent stream in the separator warm hydroprocessing line 44 and the vaporous hot flash stream in the hot flash overhead line 68 at lower pressure to separate a liquid flash warm hydroprocessing stream in a warm flash hydroprocessing line 74 from a vaporous warm flash stream in a warm flash overhead line 78, which can be transported to a cold flash drum 80 after cooling. The warm hydroprocessing effluent stream in flash warm hydroprocessing line 74 is at a temperature between about 170 and about 400° C. and a pressure of between about 350 and about 6200 kPa which represent the conditions in the warm flash drum 70.

The cold flash drum 80 can receive a separator cold hydroprocessing effluent stream in the separator cold hydroprocessing line 54 from the cold separator 50. Moreover, the vaporous warm flash stream in the warm flash overhead line 78 from the warm flash drum 70 can be cooled and provided to the cold flash drum 80. Consequently, the cold flash drum 80 is in downstream communication with the cold separator 50, the warm separator 40, the hot separator 30, the hot flash drum 60, the warm flash drum 70 and the hydroprocessing reactor 12. The cold flash drum 80 flashes the cold hydroprocessed effluent stream in the separator cold hydroprocessing line 54 and the vaporous warm flash stream in the warm flash overhead line 78 to separate a liquid flash cold hydroprocessing stream in a flash cold hydroprocessing line 84 from a vaporous cold flash stream comprising normally gaseous hydrocarbons in a cold flash overhead line 88. The hot flash drum 60, the warm flash drum 70 and the cold flash drum 80 are used to reduce the pressure of the hydroprocessed effluent while separating gases from liquids. It is envisioned that one or all of the flash drums 60, 70, 80 can be dispensed with, so that the separator hydroprocessing effluent streams 34, 44 and 54 can be taken directly to the fractionation section 100. The cold hydroprocessing effluent stream in the flash cold hydroprocessing line 84 is at a temperature of no more than about 100° C. and a pressure of between about 350 and about 6200 kPa which represent the conditions in the cold flash drum 80.

In an aspect, the cold hydroprocessing effluent stream may be the separator cold hydroprocessing effluent stream in the separator cold hydroprocessing line 54, the warm hydroprocessing effluent stream may be the separator warm hydroprocessing effluent stream in the separator warm hydroprocessing line 44 and the hot hydroprocessing effluent stream may be the separator hot hydroprocessing effluent stream in separator hot hydroprocessing line 34, but other sources of these streams are contemplated. In an additional aspect, the cold hydroprocessing effluent stream may be the cold flash hydroprocessing effluent stream in the flash cold hydroprocessing line 84, the warm hydroprocessing effluent stream may be the warm flash hydroprocessing effluent stream in flash warm hydroprocessing line 74 and the hot hydroprocessing effluent stream may be the hot flash hydroprocessing effluent stream in flash hot hydroprocessing line 64. Aqueous streams may be removed from boots in each of the flash drums 60, 70 or 80 and the cold separator 50.

In the embodiment of FIG. 1, the fractionation section 100 may include a cold stripper column 110, a debutanizer column 140, a hot stripper column 150, and a product fractionation column 170. In accordance with this embodiment, the fractionation section 100 utilizes two separate stripper columns 110 and 150. The cold stripper column 110 strips the cold hydroprocessing effluent stream and a hot stripper column 150 strips the hot hydroprocessing effluent stream and the warm hydroprocessing effluent stream. The cold stripper column 110 is in downstream communication with the hydroprocessing reactor 12, the cold separator 50 and/or the cold flash drum 80 for stripping the relatively cold hydroprocessing effluent stream which is a portion of the hydroprocessing effluent stream in hydroprocessing effluent line 16. The hot stripper column 150 is in downstream communication with the hydroprocessing reactor 12, the hot separator 30 and/or the hot flash drum 60 for stripping the relatively hot hydroprocessing effluent stream which is also a portion of the hydroprocessing effluent stream in hydroprocessing effluent line 16. In the embodiment of FIG. 1, the hot stripper column 150 is also in downstream communication with the warm separator 40 and/or the warm flash drum 70 for stripping the relatively warm hydroprocessing effluent stream which is also a portion of the hydroprocessing effluent stream in hydroprocessing effluent line 16.

The cold hydroprocessing effluent stream which in an aspect may be in the cold flash hydroprocessing line 84 or the separator cold hydroprocessing line 54 may be heated and fed to the cold stripper column 110 near the top of the column. The cold hydroprocessing effluent in the flash cold hydroprocessing line 84 or the separator cold hydroprocessing line 54 bypasses and is out of communication with the hot stripper column 150.

The cold hydroprocessing effluent stream which comprises at least a portion of the hydroprocessing effluent stream may be stripped in the cold stripper column 110 with a cold stripping media which is an inert gas such as steam from a cold stripping media line 114 to provide a cold vapor stream of LPG, naphtha, hydrogen, hydrogen sulfide, steam and other gases in an overhead line 116. At least a portion of the cold vapor stream may be condensed and separated in a receiver 118. A net overhead line 122 from the receiver 118 carries vaporous off gas perhaps for further treating. A condensed cold overhead stream comprising unstabilized liquid naphtha from the bottoms of the receiver 118 in a condensed line 120 may be split between a reflux stream in line 124 refluxed to the top of the cold stripper column 110 and a net condensed cold overhead stream which may be transported in condensed cold overhead line 126 to further fractionation such as in the debutanizer 140. The cold stripped stream in cold stripped line 112 recovered from a bottom of the cold stripper column 110 comprises diesel that boils in the diesel boiling range and can be used as diesel blending stock without further fractionation. The cold stripper column 110 may be operated with a bottoms temperature between about 149° C. (300° F.) and about 260° C. (500° F.) and an overhead pressure of about 0.5 MPa (gauge) (73 psig) to about 2.0 MPa (gauge) (290 psig). The temperature in the overhead receiver 118 ranges from about 38° C. (100° F.) to about 66° C. (150° F.) and the pressure is essentially the same as in the overhead of the cold stripper column 110.

The unstabilized naphtha in condensed cold overhead line 126 is fed to the debutanizer column 140 which is in downstream communication with the hydroprocessing reactor 12 and the cold stripper column 110. The debutanizer column fractionates the unstabilized naphtha to provide a net off-gas stream in line 142 and a net LPG stream comprising predominantly $C_4-$ hydrocarbons in line 144 and a naphtha stream comprising predominantly $C_5+$ hydrocarbons in bottoms line 146. The debutanizer column may be operated at a top pressure of about 1034 to about 2758 kPa (gauge) (150 to 400 psig) and a bottom temperature of about 149 to about 260° C. (300 to 500° F.). The pressure should be maintained as low as possible to maintain reboiler temperature as low as possible while still allowing complete condensation with typical cooling utilities without the need for refrigeration.

The hot hydroprocessing effluent stream which may be in the flash hot hydroprocessing line 64 or the separator hot hydroprocessing line 34 may be fed to the hot stripper column 150. The warm hydroprocessing effluent stream which may be in the flash warm hydroprocessing line 74 or the separator warm hydroprocessing line 44 may be fed to the hot stripper column 150 near the top thereof and at a location above the feed inlet for the hot hydroprocessing effluent stream in flash hot hydroprocessing line 64 or the separator hot hydroprocessing line 34. The hot hydroprocessing effluent stream and the warm hydroprocessing effluent stream which comprise at least a portion of the liquid hydroprocessing effluent may both be stripped in the hot stripper column 150 with a hot stripping media which is an inert gas such as steam from line 152 to provide a hot vapor stream of diesel, naphtha, hydrogen, hydrogen sulfide, steam and other gases in an overhead line 154. At least a portion of the hot vapor stream may be condensed and separated in a receiver. However, in an aspect, the hot stripper overhead stream in overhead line 154 may be fed directly to the cold stripper column with an inlet location below the inlet location of the cold hydroprocessed effluent in the cold separator hydroprocessing line 54 or the cold flash hydroprocessing line 84. The hot stripper column 150 may be operated with a bottoms temperature between about 160° C. (320° F.) and about 371° C. (700° F.) and an overhead pressure of about 0.5 MPa (gauge) (73 psig) to about 2.0 MPa (gauge) (292 psig).

A hydroprocessed hot stripped stream is produced in a hot stripped line 158. At least a portion of the hot stripped stream in hot stripped line 158 may be fed to the product fractionation column 170 which may be a vacuum column for fractionation therein. Consequently, the product fractionation column 170 is in downstream communication with the hot stripped line 158 of the hot stripper column 150.

A fired heater 130 in downstream communication with the hot stripped line 158 may heat at least a portion of the hot stripped stream before it enters the product fractionation column 170. The product fractionation column 170 may be out of downstream communication with the cold stripper column 110. The product fractionation column 170 may strip the hot stripped stream in hot stripped line 158 with stripping media such as steam from line 172 to provide several product streams. The product streams may include a light diesel stream in overhead line 174, a heavy diesel stream in line 175 from a side cut outlet, a light vacuum gas oil (LVGO) stream in line 176 from a side cut outlet, a heavy vacuum gas oil (HVGO) stream in line 177 from a side cut outlet and a slop wax stream in line 178 from a side cut outlet and a bottoms pitch stream in line 180. Heat may be removed from the product fractionation column 170 by cooling the diesel stream in line 175, the LVGO stream in line 176 and the HVGO stream in line 177 and sending a portion of each cooled stream back to the column.

In an aspect, the product fractionation column 170 may be operated as a vacuum column. As such, the overhead light diesel stream in line 174 may be pulled from the product fractionation column 170 through a vacuum system 182 on an overhead line 186 of the product fractionation column 170. The vacuum system may include an eductor for generating a vacuum when a steam stream or other inert gas stream in line 184 is fed through the eductor. The product fractionation column 170 is maintained at a pressure between about 0.1 and 6.7 kPa(a) (1 and 50 torr(a)), preferably between about 0.2 and 2.0 kPa(a) (1.5 and 15 torr(a)) and at a vacuum distillation temperature of about 300° to about 400° C. (572° to 752° F.) resulting in an atmospheric equivalent cut point between HVGO and pitch of between about 454° and 593° C. (850° and 1100° F.), preferably between about 482° and 579° C. (900° and 1075° F.), and most preferably between about 510° and 552° C. (950° and 1025° F.).

In the embodiment of FIG. 1, the cold stripper bottom stream in cold stripped line 112 is recovered directly as a diesel blending stock without further fractionation. In this process and apparatus, the product fractionation column 170 does not need to re-separate the cold stripped bottoms stream in cold stripped line 112 at vacuum. As a consequence, the heater duty in fired heater 130 for the product fractionation column 170 is reduced significantly because only the hot stripped line 158 is fed to the product fractionation column 170 and the fired heater 130. Therefore, the size of the product fractionation column 170 and the fired heater 130 and the cost to operate them are both reduced at the same time.

Capital cost for a two-stripper configuration will counter intuitively decrease over a conventional one-stripper design. The two-stripper design of FIG. 1 has two stripper columns 110, 150 instead of one conventional large stripper column. The two stripper design of FIG. 1 has no atmospheric fractionation column 200 or an associated fired heater 198. As a result, the two-stripper design of FIG. 1 requires 22% less in capital costs to construct than a conventional one-stripper design.

Figure 2:
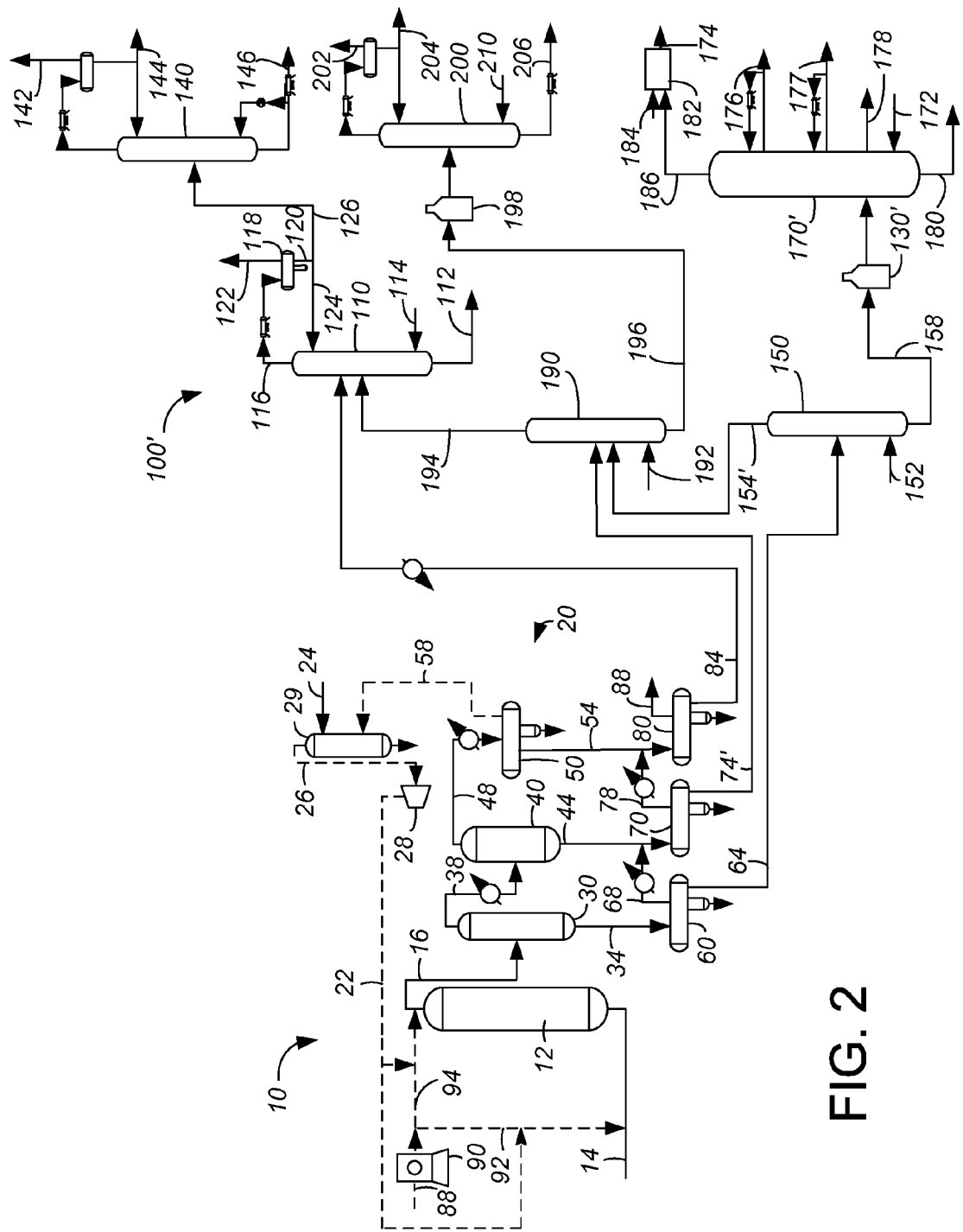
FIG. 2 is a simplified process flow diagram of an alternative embodiment of FIG. 1.

The embodiment in FIG. 2 utilizes three strippers, further including a warm stripper column 190. Many of the elements in FIG. 2 have the same configuration as in FIG. 1 and bear the same respective reference number. Elements in FIG. 2 that correspond to elements in FIG. 1 but have a different configuration bear the same reference numeral as in FIG. 1 but are marked with a prime symbol (').

The cold hydroprocessing effluent stream in flash cold hydroprocessing line 84 or separator cold hydroprocessing line 54 is stripped in the cold stripper column 110 and the hot hydroprocessing effluent stream in the separator hot hydroprocessing line 34 or the flash hot hydroprocessing line 64 is stripped in the hot stripper column 150 as in the embodiment of FIG. 1. However, the warm hydroprocessing effluent stream which may be in the separator warm hydroprocessing line 44 or a flash warm hydroprocessing line 74' may be fed to a warm stripper column 190 near a top thereof. The warm hydroprocessing effluent stream which comprises at least a portion of the liquid hydroprocessing effluent may be stripped in the warm stripper column 190 with a warm stripping media which is an inert gas such as steam from a line 192 to provide a warm vapor stream of diesel, naphtha, and other gases in an overhead line 194 and a warm stripped stream in a warm stripped line 196 comprising diesel and VGO.

At least a portion of the warm vapor stream may be condensed and separated in a receiver. However, in an aspect, the warm stripper overhead stream in overhead line 194 may be fed directly to the cold stripper column 110 with an inlet location below the inlet location of the cold hydroprocessed effluent in the separator cold hydroprocessing line 54 or the flash cold hydroprocessing line 84. Consequently, the cold stripper column 110 strips the cold hydroprocessing effluent stream in line 54 or line 84 and the vapor warm stripper overhead stream in overhead line 194. Moreover, the cold stripper column 110 is in downstream communication with an overhead line 194 of the warm stripper column.

The warm stripped stream in warm stripped line 196 taken from the bottom of the warm stripper in warm stripped line 196, may be heated in a fired heater 198 and fed to an atmospheric fractionation column 200 in downstream communication with the warm stripper column 190. The warm stripper column 190 may be operated with a bottoms temperature between about 170 C (338° F.) and about 400° C. (752° F.) and an overhead pressure of about 0.5 MPa (gauge) (73 psig) to about 2.0 MPa (gauge) (290 psig).

In this embodiment, the hot stripper 150 only strips the hot hydroprocessing effluent stream in the separator hot hydroprocessing line 34 or the flash hot hydroprocessing line 64 and does not receive the warm hydroprocessing effluent stream in flash warm hydroprocessing line 74' or separator warm hydroprocessing line 44. At least a portion of the hot vapor stream may be condensed and separated in a receiver. However, in an aspect, the vapor hot stripper overhead stream in overhead line 154' may be fed directly to the warm stripper column 190 with an inlet location below the inlet location of the warm hydroprocessed effluent in line 74'. Consequently, the warm stripper column 190 strips the warm hydroprocessing effluent stream in line 74' and the vapor hot stripper overhead stream in overhead line 154'. Moreover, the warm stripper column 190 and/or the cold stripper column 110 are in downstream communication with the overhead line 154' of the hot stripper column.

The product fractionation column 170' which may be a vacuum product fractionation column fractionates the hot stripped stream in hot stripped line 158 after heating in the fired heater 130', but the hot stripped stream does not comprise the warm hydroprocessing effluent from the flash warm hydroprocessing line 74' or the separator warm hydroprocessing line 44. Because diesel streams are recovered in lines 112 and 204, no heavy diesel stream need be pulled from a side cut from the product fractionation column 170' as in FIG. 1.

The heated warm stripped stream in warm stripped line 196 is fed to the atmospheric fractionation column 200 which is in downstream communication with the hydroprocessing reactor 12 and the warm stripper column 190. An inert gas stream such as steam in line 210 may be used to provide heat to the atmospheric fractionation column 200. The atmospheric fractionation column 200 fractionates the warm stripped stream to provide a net off-gas stream in line 202, a net condensed diesel stream in line 204 and a VGO stream in a net bottoms line 206 which may be further processed in an FCC unit or a hydrocracking unit. The atmospheric fractionation column may be operated at a top pressure of about 7 to about 345 kPa (gauge) (1 to 50 psig) and a bottom temperature of about 260 to about 399° C. (500 to 750° F.).

In this embodiment, the feed heater duty in the fractionation section 100' is reduced 20% further from the two-stripper design of FIG. 1. This is because the design eliminates the need for vaporizing the VGO range material in the warm hydroprocessed effluent stream. By decreasing the feed rate to the fired heater 130', the fuel used in the fired heaters 198 and 130' is decreased approximately 50 percent comparing with a one-stripper design and 20 percent from the fuel used in fired heater 130 in the two-stripper design of FIG. 1.

Capital costs for a three-stripper configuration will counter intuitively decrease. The three-stripper configuration of FIG. 2 has three stripper columns 110, 150, 190 instead of one conventional large stripper column. The two stripper design of FIG. 1 has no atmospheric fractionation column 200 or an associated fired heater 198, but the product fractionation column 170 in FIG. 1 is taller than that required of the product fractionation column 170' in the embodiment of FIG. 2. The fired heater 130' for the vacuum product fractionation column size is also larger in the embodiment of FIG. 1 than in FIG. 2. The three-stripper design of FIG. 2 has a smaller atmospheric fractionation column 200 and associated fired heater 198 than for a conventional one-stripper column design and a smaller vacuum product fractionation column 170' and heater 130' than required for a one-stripper design and a two-stripper design. As a result, the two-stripper design of FIG. 1 requires 22% less in capital costs to construct than a conventional one-stripper design; whereas, the three-stripper design of FIG. 2 requires 19% less in capital than the conventional one-stripper design.

Figure 3:
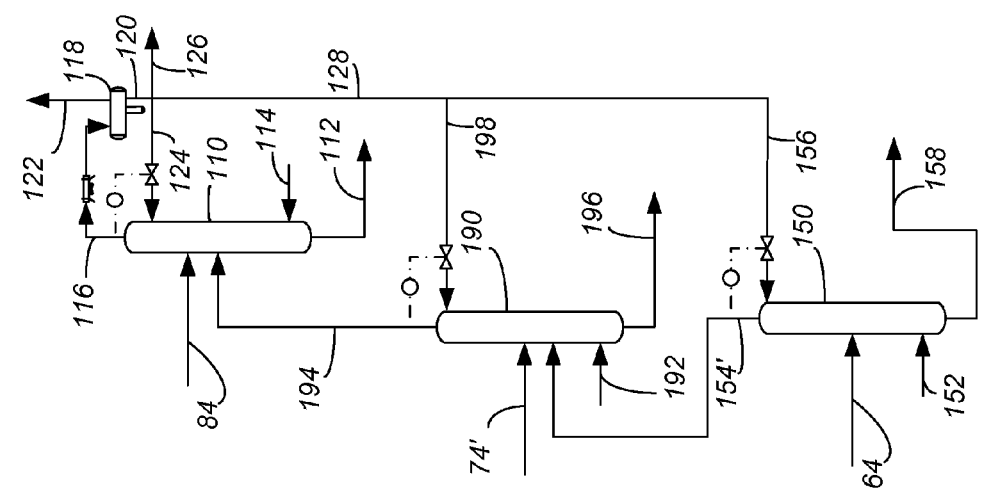

The embodiment in FIG. 3 shows a process and apparatus in which reflux from a single overhead condenser for the cold stripper is split between the three stripper columns instead of requiring overhead condensers for each stripper column. The elements shown in FIG. 3 have the same configuration as in FIGS. 1 and 2 and bear the same respective reference numerals. FIG. 3 is an alternative embodiment to FIG. 2 which is generally the same except that a condensed stream from the cold stripper overhead condenser in line 120 is split into three streams. Unstabilized liquid naphtha from the bottoms of the receiver 118 in condensed line 120 may be split between a reflux stream in line 124 refluxed to the top of the cold stripper column 110, an unstabilized stream which may be transported in condensed cold overhead line 126 to further fractionation such as in the debutanizer 140 and a reflux recycle stream in line 128 for providing condensate for reflux to the warm stripper column 190 and the hot stripper column 150. The reflux recycle stream provides a warm stripper reflux stream provided in line 198 for reflux to a top of the warm stripper and a hot stripper reflux stream provided in line 156 for reflux to a top of the hot stripper column 150. Consequently, the warm stripper column 190 and/or the hot stripper column 150 are in downstream communication with the overhead line 116 of the cold stripper column 110. The flow rate of the reflux streams to the respective stripper columns 110, 190, 150 in lines 124, 198 and 156, respectively, may be governed by a control valve that is set by the temperature indicated in the respective stripper overhead stream in lines 116, 194, 154', respectively.

Figure 4:
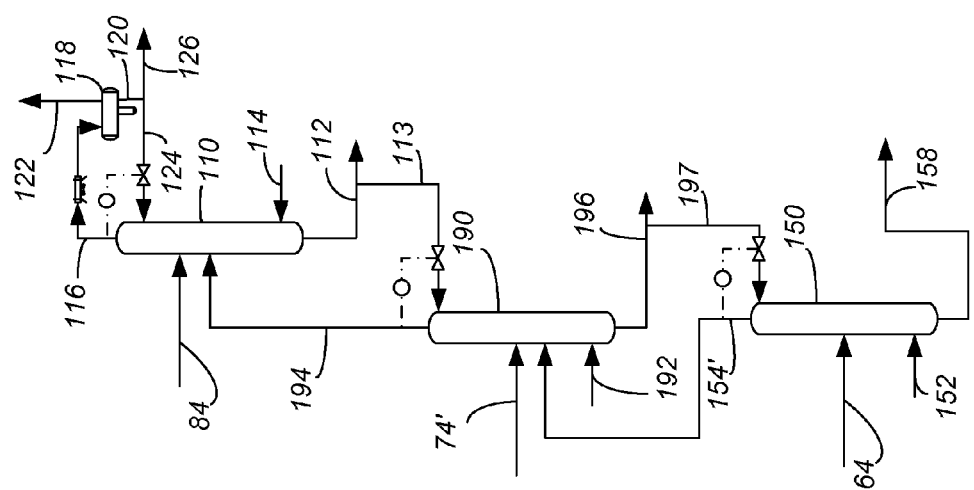

The embodiment in FIG. 4 shows a process and apparatus in which a portion of a bottoms stream from a cold stripper column 110 is refluxed to the warm stripper column 190, and a bottoms stream from the warm stripper column is refluxed to the hot stripper column 150 instead of requiring overhead condensers for each stripper column to provide reflux. The elements shown in FIG. 4 have the same configuration as in FIGS. 1 and 2 and bear the same respective reference numerals. FIG. 4 is an alternative embodiment to FIG. 2 which is generally the same with the following exceptions. A portion of the cold stripped stream in a cold stripped line 112 is diverted in line 113 and refluxed to a top of the warm stripper column 190. Moreover, a portion of the warm stripped stream in the warm stripped line 196 is diverted in line 197 and refluxed to a top of the hot stripper column 150. Consequently, the warm stripper column and/or the hot stripper column are in downstream communication with the cold stripped line 112 of the cold stripper column and the hot stripper column 150 is in downstream communication with the warm stripped line 196 of the warm stripper column 190. The flow rate of the reflux streams to the respective stripper columns 110, 190, 150 in lines 124, 113 and 197, respectively, may be governed by a control valve that is set by the temperature indicated in the respective stripper overhead stream in lines 116, 194, 154', respectively.

Figure 5:
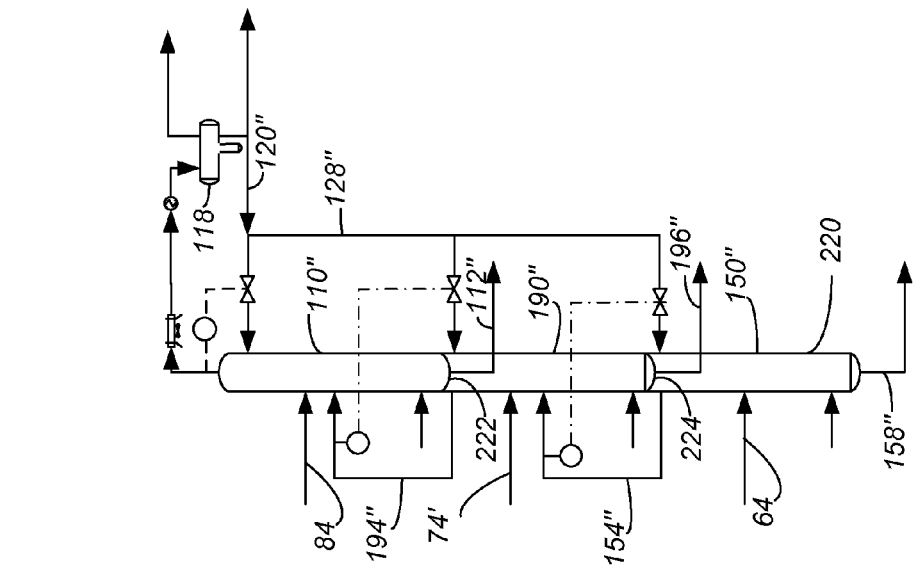
FIGS. 3-6 are partial, simplified process flow diagrams of an additional alternative embodiment of FIG. 2.

The embodiment of FIG. 5 shows a process and apparatus in which all of the stripper columns 110", 150" and 190" are stacked in a single stripper vessel 220. Many of the elements in FIG. 5 have the same configuration as in FIG. 2 and bear the same respective reference number. Elements in FIG. 5 that correspond to elements in FIG. 2 but have a different configuration bear the same reference numeral as in FIG. 2 but are marked with a double prime symbol ("). The cold stripper column 110" and the warm stripper column 190" may be separated by a first impermeable wall 222 which may be insulated to prevent heat transfer. The warm stripper column 190" and the hot stripper column 150" may be separated by a second impermeable wall 224 which also may be insulated to prevent heat transfer. Each stripper column 110", 150" and 190" is fed with respective cold, hot and warm hydroprocessed effluent streams in lines 84, 64 and 74' and are stripped to produce stripped streams in lines 112", 158" and 196". Lines 112" and 196" have to penetrate a wall of the single stripper vessel 220. The hot overhead stream 154" may be fed from the hot stripper column 150" to the warm stripper column below the inlet for the warm hydroprocessing stream in line 74'. The warm overhead stream 194" may be fed from the warm stripper column 190" to the cold stripper column below the inlet for the cold hydroprocessing stream in line 84. The reflux arrangement in FIG. 5 is similar to the reflux arrangement in FIG. 3 in which the condensed stream 120" from the cold overhead receiver 118 provides reflux for all of stripper columns 110", 190" and 150".

Figure 6:
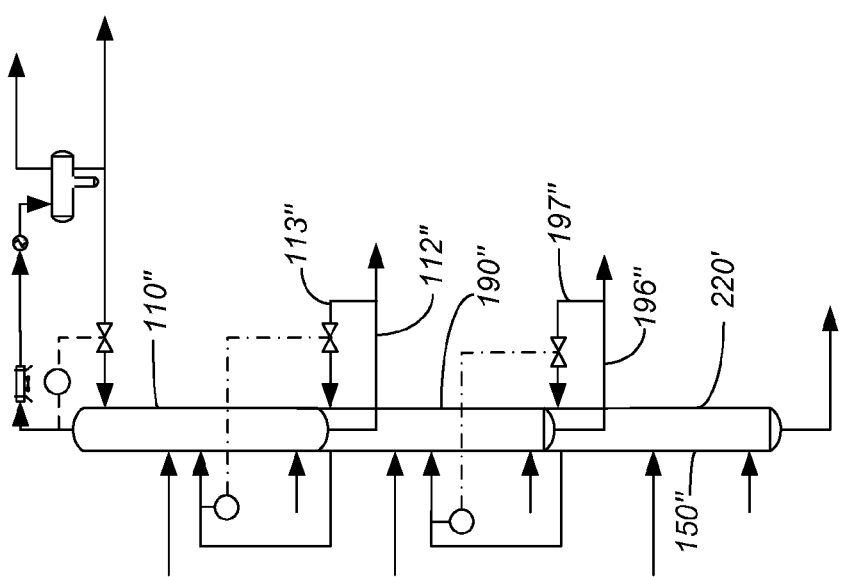

The embodiment of FIG. 6 shows a process and apparatus in which all of the stripper columns 110", 150" and 190" are stacked in a single stripper vessel 220'. Many of the elements in FIG. 6 have the same configuration as in FIG. 4 and bear the same respective reference number. Elements in FIG. 6 that correspond to elements in FIG. 4 but have a different configuration bear the same reference numeral as in FIG. 4 but are marked with a double prime symbol ("). The reflux arrangement in FIG. 6 is similar to the reflux arrangement in FIG. 4 in which a portion of the cold stripped stream in the cold stripped line 112" from the cold stripper column 110" is diverted in line 113" and refluxed to a top of the warm stripper column 190". Moreover, a portion of the warm stripped stream in the warm stripped line 196" is diverted in line 197" and refluxed to a top of the hot stripper column 150".

Figure 7:
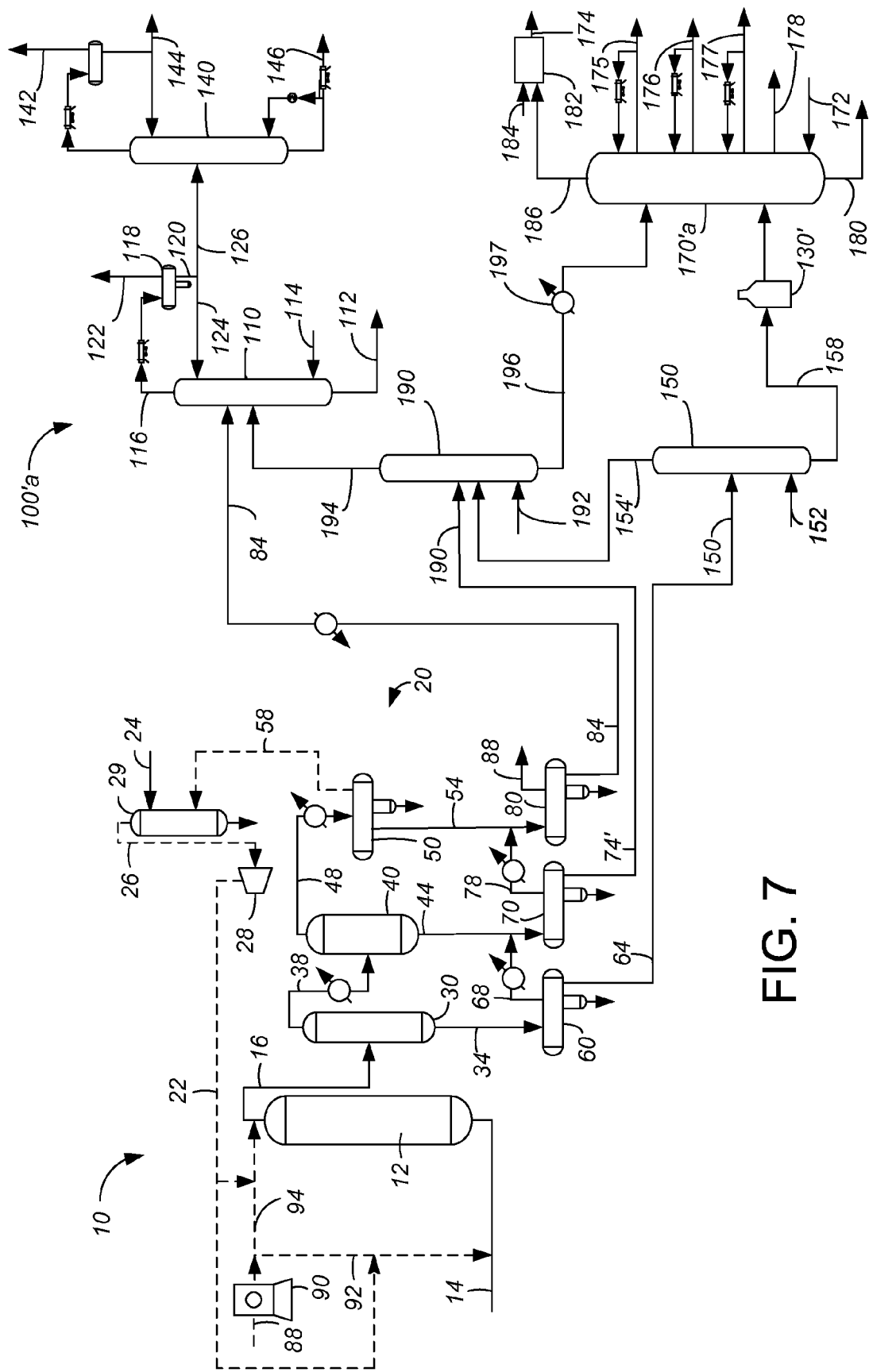
FIG. 7 is a simplified process flow diagram of a further alternative embodiment of FIG. 2.

The embodiment in FIG. 7 utilizes a product fractionation column 170'$a$ but omits the atmospheric fractionation column and its associated fired heater. Many of the elements in FIG. 7 have the same configuration as in FIG. 2 and bear the same respective reference number. Elements in FIG. 7 that correspond to elements in FIG. 2 but have a different configuration bear the same reference numeral as in FIG. 2 but are marked with a suffix (a).

The apparatus and process in FIG. 7 is the same as in FIG. 2 with following exceptions. In FIG. 7, a product fractionation column 170'$a$ is in downstream communication with the warm stripper column 190 and the hot stripper column 150. The warm stripper column 190 is in downstream communication with the hydroprocessing reactor 12. The product fractionation column 170'$a$ is in downstream communication with the warm stripped line 196 from a bottom of the warm stripper column 190 and the hot stripped line 158 from a bottom of the hot stripper column 150. The warm stripped stream and the hot stripped stream are fractionated in the same fractionation column. In an aspect, the product fractionation column 170'$a$ is a vacuum fractionation column operated at below atmospheric pressure. As such, the overhead diesel stream in line 174 may be pulled from the product fractionation column 170'$a$ through a vacuum system 182 which may be generated by feeding a steam stream or other inert gas stream in line 184 through an eductor in the vacuum system 182 on the overhead line 186 of the product fractionation column 170'$a$. A fired heater 130' is in downstream communication with the hot stripped stream in hot stripped line 158. The fired heater 130' heats the hot stripped stream before it enters the product fractionation column 170'$a$. However, the fired heater 130' need not be in communication with the warm stripped stream in the warm stripped line 196 or the warm stripper column 190. The warm stripped stream does not need to be heated in a fired heater before it is fractionated in the product fractionator column 170'$a$. Indeed, because the warm stripped stream is hot relative to the top of the product fractionation column 170'$a$, medium pressure steam can be generated from a heat exchanger 197 on the warm stripped line 196. Because the product fractionation column 170'$a$ omits the atmospheric fractionation column of FIG. 2, a diesel stream may be additionally recovered in line 175 with a portion being cooled and pumped back to the product fractionation column 170'$a$.

The product fractionation column 170'$a$ is not in communication with the cold stripper column 110. Instead, the cold stripped stream in cold stripped line 112 may be recovered from a bottom of the cold stripper column 110 as a diesel stream which may be recovered as a diesel blending stock without further fractionation. The condensed cold overhead stream in net cold overhead line 126 is fractionated in the debutanizer column 140 to separate a naphtha stream comprising predominantly $C_5+$ hydrocarbons in bottoms line 146 from a net LPG stream comprising predominantly $C_4-$ in line 144.

The embodiment of FIG. 7 which omits the atmospheric fractionation column has about 31% less capital cost and 47% less operating cost than a conventional unit with one-stripper column design.

Figure 8:
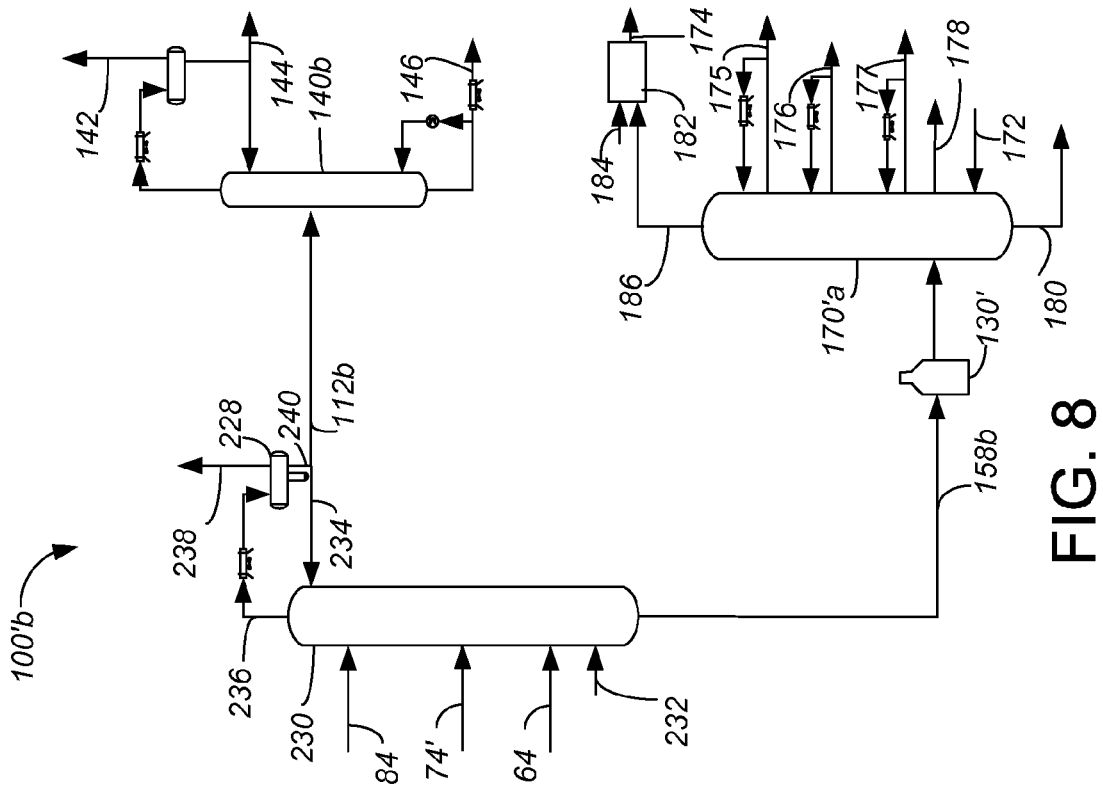
FIG. 8 is a partial, simplified process flow diagram of an alternative embodiment of FIG. 7.

The embodiment in FIG. 8 utilizes a product fractionation column 170'$a$ and omits the atmospheric fractionation column as in FIG. 7, but utilizes a single stripper column 230. Many of the elements in FIG. 8 have the same configuration as in FIG. 7 and bear the same respective reference number. Elements in FIG. 8 that correspond to elements in FIG. 7 but have a different configuration bear the same reference numeral as in FIG. 7 but are marked with a suffix (b).

The apparatus and process in FIG. 8 is the same as in FIG. 7 with following exceptions. In FIG. 8, a single stripper column 230 receives the cold hydroprocessing effluent stream in line 84, the warm hydroprocessing effluent stream in line 74' at an inlet location below an inlet for the line 84 and the hot hydroprocessing effluent stream in line 64 at an inlet location below the inlet for the line 74'. The cold hydroprocessing effluent stream, the warm hydroprocessing effluent stream and the hot hydroprocessing effluent stream are stripped with an inert gas such as steam provided in line 232 to provide a cold stripped stream in a cold stripped line 112$b$ and a hot stripped stream in a hot stripped line 158$b$ from the same single stripping column 230.

An overhead vapor stream of naphtha, LPG, hydrogen, hydrogen sulfide, steam and other gases are provide in an overhead line 236. At least a portion of the cold vapor stream may be condensed and separated in a receiver 228. A net overhead line 238 from the receiver 228 carries vaporous off gas perhaps for further treating. A condensed cold overhead stream comprising naphtha and LPG from a bottom of the receiver 228 in condensed line 240 may be split between a reflux stream in line 234 refluxed to the top of the single stripper column 230 and a net condensed cold overhead stream comprising a cold stripped stream in cold stripped line 112$b$.

The cold stripped stream in cold stripped line 112$b$ may be transported to a debutanizer 140$b$ for fractionation to separate a net LPG stream comprising predominantly $C_4-$ in line 144 from a naphtha stream comprising predominantly $C_5+$ hydrocarbons in bottoms line 146. The cold stripped line 112$b$ is in downstream communication with the single stripper column 230 and the debutanizer column 140$b$ is in downstream communication with the cold stripped line 112$b$.

The product fractionation column 170'$a$ is in direct, downstream communication with a hot stripped line 158$b$ from a bottom of the single stripper column 230. Consequently, all of the hot stripped stream in the hot stripped line 158$b$ from a bottom of the stripping column 230 is provided to the product fractionation column 170'$a$. The product fractionation column 170'$a$ is operated at below atmospheric pressure, so an eductor may be used on an overhead line 186 for drawing a vacuum on the overhead line of the product fractionation column as previously explained.

A warm stripped line need not be provided in this embodiment from the single stripper column 230. The hot stripped line 158$b$ is in downstream communication with the single stripper column 230. The hot stripped stream in hot stripped line 158$b$ is heated in a fired heater 130' before entering the product fractionation column 170'*a*. The product fractionation column fractionates the hot stripped stream in hot stripped line 158*b* at vacuum as previously described with respect to FIGS. 2 and 7.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for slurry hydrocracking comprising:
a slurry hydrocracking reactor with an outlet in a top of said slurry hydrocracking reactor;
a cold stripper column in communication with said slurry hydrocracking reactor;
a hot stripper column in communication with said slurry hydrocracking reactor;
a warm separator in communication with said slurry hydrocracking reactor, said warm separator comprising a vessel and an inlet and an outlet; and
a stripper in downstream communication with said warm separator through a warm hydroprocessing line.

2. The apparatus of claim 1 wherein said hot stripper column is in communication with said warm separator.

3. The apparatus of claim 1 further comprising a warm stripper column in communication with said warm separator.

4. The apparatus of claim 1 further comprising a cold separator in communication with said slurry hydrocracking reactor and said cold stripper column is in communication with said cold separator.

5. The apparatus of claim 1 further comprising a hot separator in communication with said slurry hydrocracking reactor and said hot stripper column is in communication with said hot separator.

6. The apparatus of claim 3 further comprising an atmospheric fractionation column in communication with said warm stripper column.

7. The apparatus of claim 3 further comprising a vacuum fractionation column in communication with said warm stripper column and said hot stripper column.

8. The apparatus of claim 3 wherein said warm stripper column and/or said hot stripper column are in communication with an overhead line of said cold stripper column.

9. The apparatus of claim 3 wherein said cold stripper column and/or said warm stripper column are in communication with an overhead line of said hot stripper column.

10. The apparatus of claim 3 wherein said warm stripper column and/or said hot stripper column are in communication with a bottoms line of said cold stripper column.

11. The apparatus of claim 3 wherein said cold stripper column, said warm stripper column and said hot stripper column are all in the same vessel.

12. The apparatus of claim 1 further comprising a debutanizer column in communication with said cold stripper column.

13. An apparatus for hydroprocessing comprising:
a hydroprocessing reactor with an outlet in a top of said hydroprocessing reactor;
a cold stripper column in communication with said hydroprocessing reactor;
a warm stripper column in communication with said hydroprocessing reactor and a fractionation column in downstream communication with a warm stripped line from a bottom of said warm stripper column; and
a hot stripper column in communication with said hydroprocessing reactor.

14. The apparatus of claim 13 wherein said hydroprocessing reactor is a slurry hydrocracking reactor.

15. The apparatus of claim 13 further comprising a warm separator in communication with said hydroprocessing reactor and said warm stripper column in communication with said warm separator.

16. The apparatus of claim 13 further comprising a warm separator in communication with said hydroprocessing reactor and said hot stripper column in communication with said warm separator.

17. The apparatus of claim 13 further comprising a vacuum fractionation column in communication with said warm stripper column.

18. An apparatus for slurry hydrocracking comprising:
a slurry hydrocracking reactor with an outlet in a top of said slurry hydrocracking reactor;
a cold stripper column in communication with said slurry hydrocracking reactor;
a warm stripper column in communication with said slurry hydrocracking reactor; and
a hot stripper column in communication with said slurry hydrocracking reactor.

19. The apparatus of claim 18 further comprising a warm separator in communication with said slurry hydrocracking reactor.

20. The apparatus of claim 18 further comprising a vacuum fractionator column in communication with said warm stripper column and said hot stripper column.

* * * * *